July 17, 1962 W. E. GLENN, JR 3,044,358

COLOR PROJECTION SYSTEM

Filed Dec. 24, 1958 3 Sheets-Sheet 1

Inventor:
William E. Glenn, Jr.,
by Richard R. Brainard
His Attorney.

July 17, 1962 W. E. GLENN, JR 3,044,358

COLOR PROJECTION SYSTEM

Filed Dec. 24, 1958 3 Sheets-Sheet 2

Inventor:
William E. Glenn, Jr.,
by Richard R. Brainard
His Attorney.

July 17, 1962 W. E. GLENN, JR 3,044,358

COLOR PROJECTION SYSTEM

Filed Dec. 24, 1958 3 Sheets-Sheet 3

Inventor:
William E. Glenn, Jr.,
by Richard R. Brainard
His Attorney.

United States Patent Office 3,044,358
Patented July 17, 1962

3,044,358
COLOR PROJECTION SYSTEM

William E. Glenn, Jr., Scotia, N.Y., assignor to General Electric Company, a corporation of New York Filed Dec. 24, 1958, Ser. No. 782,956
10 Claims. (Cl. 88—61)

Figures 1, 6, 7:
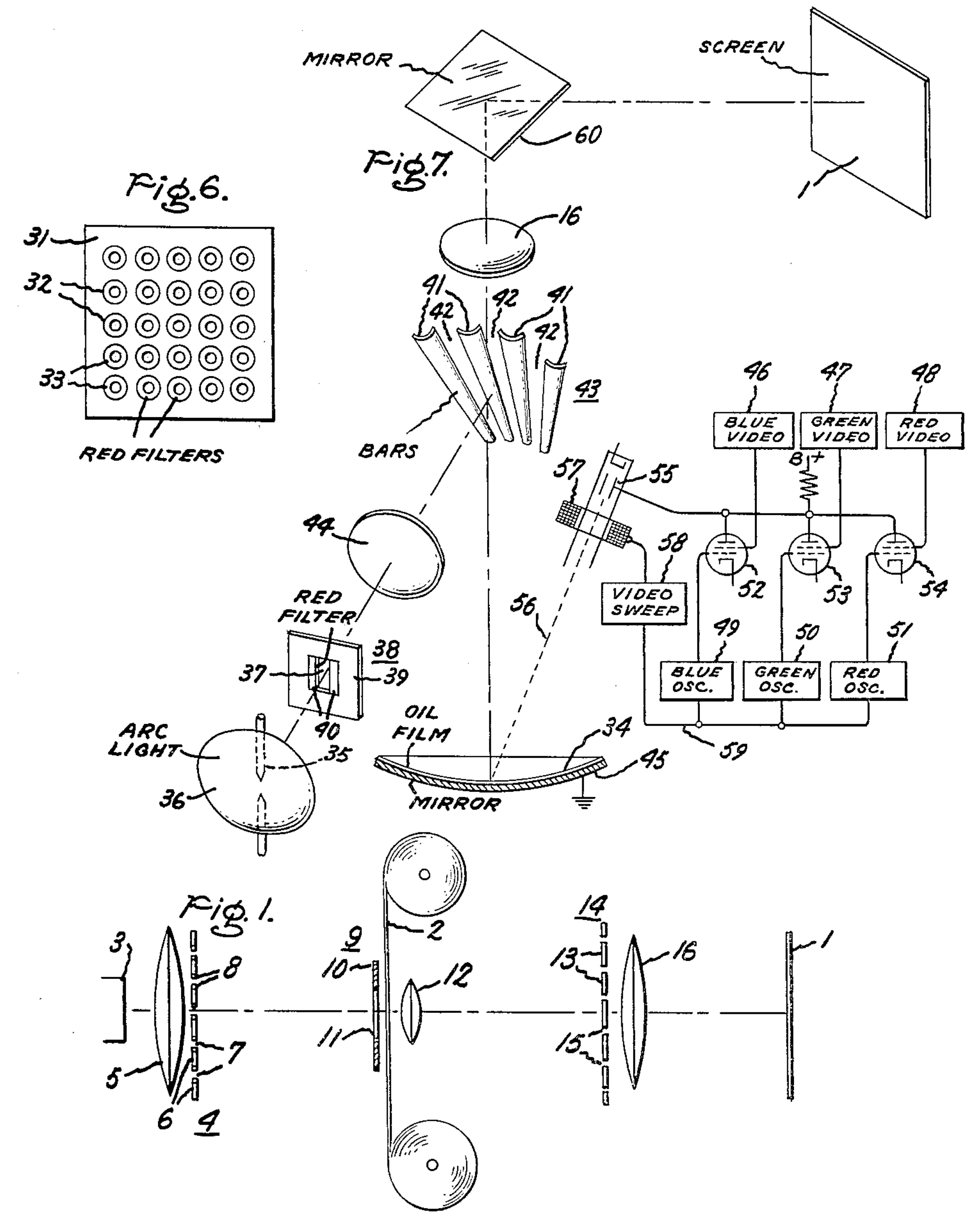

The present invention relates to an improved system for projecting color images corresponding to diffraction gratings in a light modulating medium.

In a known television system, an electron beam produces an electron charge pattern corresponding point-by-point in magnitude with the light intensity of a televised picture. Through electrostatic forces, this charge pattern deforms the surface of a deformable light modulating medium into a corresponding phase diffraction grating. When light is incident on this surface, this diffraction grating diffracts some of this light through transparent areas in a light mask. Then the light transmitted by the light mask is focused on a projection screen where it forms a black and white image corresponding to the televised picture.

A color projection system is described and claimed in my Patent No. 2,813,146, granted November 12, 1957, and assigned to the assignee of the present invention. In this patented system, the electron beam produces an electron beam charge pattern that simultaneously forms three diffraction gratings. They correspond point-by-point respectively, with the red, green, and blue color content of the televised picture. With the transparent areas in the light mask suitably positioned and dimensioned, substantially only the first order diffracted red, green, and blue light is transmitted to the projection screen. There it combines to form a color image corresponding point-by-point with the televised picture.

The light diffracted through the light mask is in the form of three spectrums each of which although centered about a respective red, green, or blue wavelength has a finite width. It is desirable that the red spectrum not extend into the green region for if it does, the red diffraction grating—the one corresponding to the red color intensity—diffracts some green light through the light mask to the projection screen. This green light significantly desaturates the red since the eye is more sensitive to green than to red. Thus, the green end of the red primary color spectrum should cut off sharply to provide red primary color saturation.

Accordingly, an object of the present invention is to provide in a color projection system an improved optical system for producing a purer red color.

Another object is to provide a color projection system for producing a purer red color.

Some second order diffracted light from the red diffraction grating is transmitted by the light mask. Because this light is in the green wavelength region, it desaturates the red color. Red desaturation can be decreased if the center wavelength of the red primary color spectrum is shifted to a longer wavelength. Then the second order diffracted light shifts twice as much since it has twice the dispersion. It becomes much redder and thus desaturates the red color much less. This shift can not be done in prior optical systems since while it increases the red saturation it significantly lowers the intensity of the transmitted red color at the wavelengths at which the eye is most sensitive to red.

Thus, a further object of the present invention is to provide an optical system in which the center frequency of the transmitted red color spectrum can be shifted to longer wavelengths without substantially decreasing the red color content of the projected pictures.

In prior optical systems for color projection systems the brightness of the projected images is not the same for all three primary colors. Rather, the red light is usually proportionally less due to the deficiency in red light of many light sources.

Thus, another object of the present invention is to provide in a color projection system an improved optical system for increasing the realtive proportion of the red primary color.

Still another object is to provide an improved color projection system with an improved optical system for producing a color image corresponding closely to applied color information.

In carrying out my invention in one form, I increase the relative intensity of the projected red light by placing red filters along the sides of the transparent areas in the light mask. They increase the area widths solely for red light. The resulting sharp increase in intensity of the transmitted shorter red wavelengths permits sufficient intensity at these wavelengths even when the red center wavelength is shifted to a longer wavelength.

Figure 2:
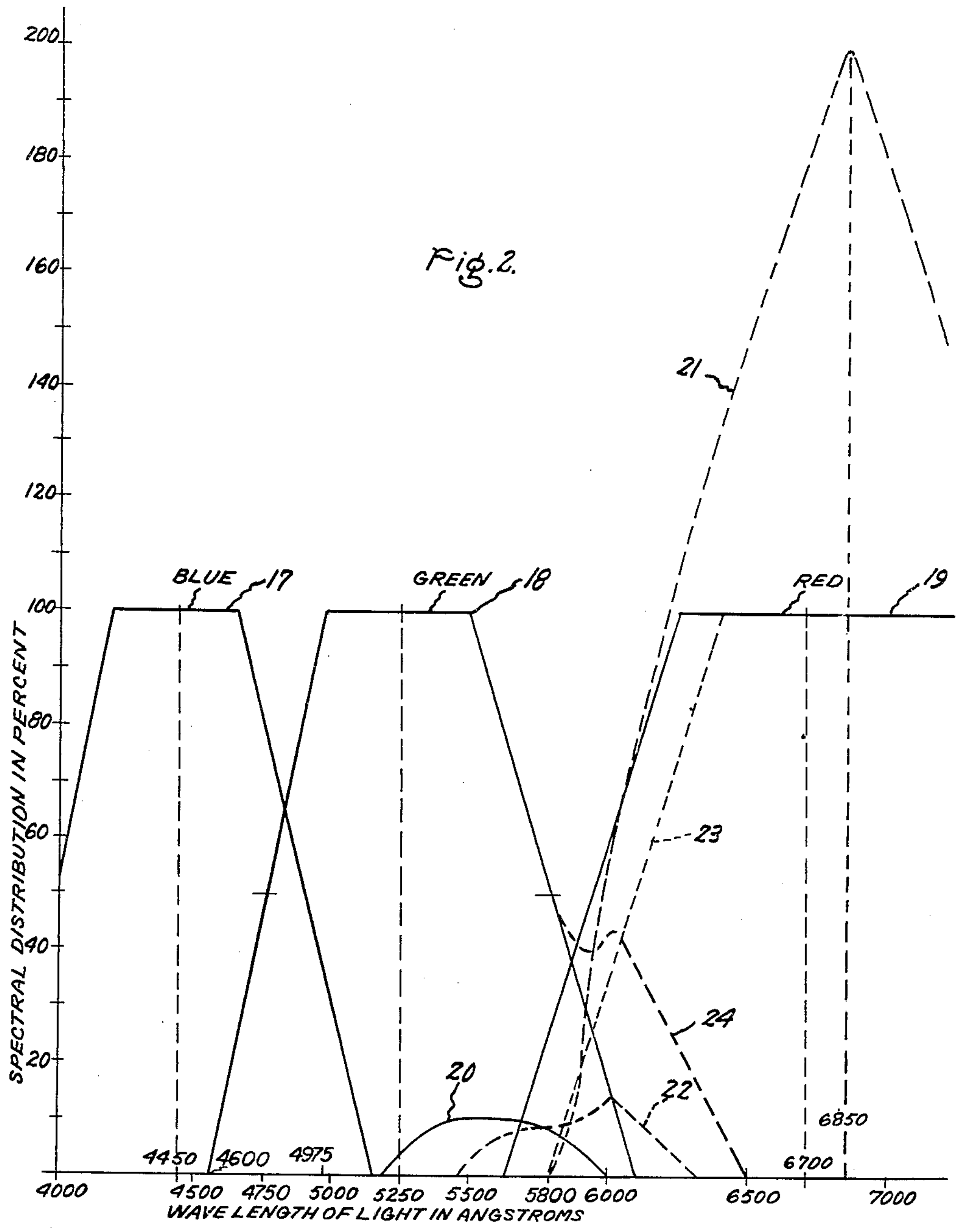
Figure 3:
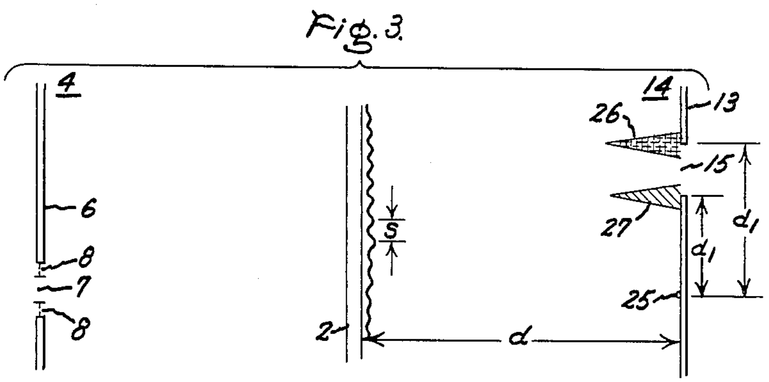
Figure 4:
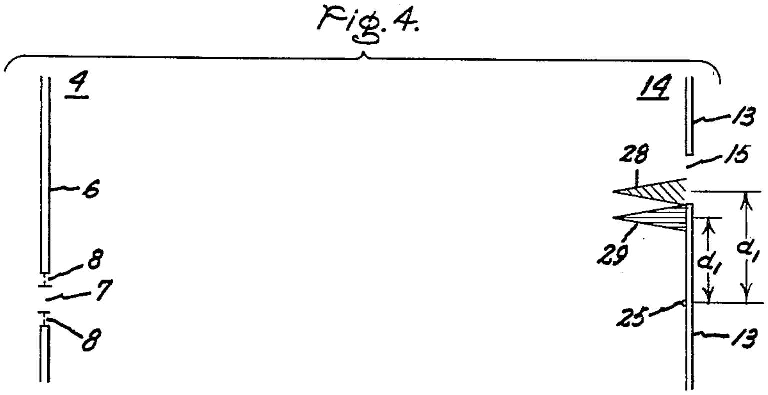
Figure 5:
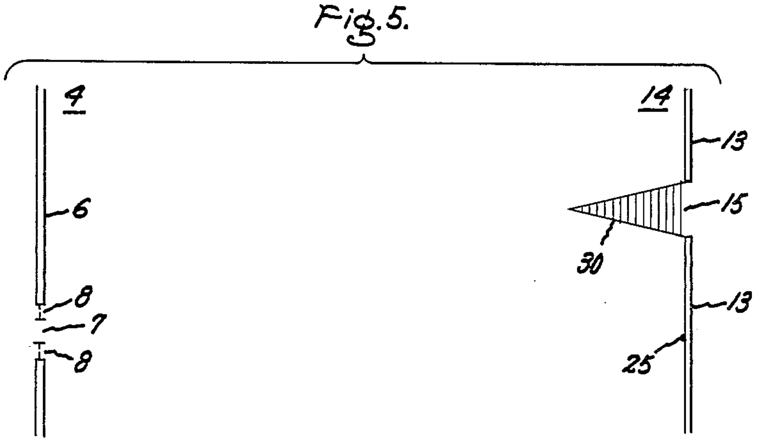

The novel features believed characteristic of the invention are set forth in the appended claims. The invention itself, together with further objects and advantages thereof may best be understood by reference to the following description, taken in connection with the accompanying drawings, in which:

FIG. 1 is a schematic illustration of a transmission-type optical system embodiment of my invention, FIG. 2 is a spectral distribution diagram for a three-primary color system, FIGS. 3–5 are enlarged schematic diagrams of portions of the system of FIG. 1, illustrating the positions of images of light of certain wavelengths, FIG. 6 is a plan view of a light mask, two of which can be used in lieu of the light masks in the system of FIG. 1, and FIG. 7 is a schematic illustration of a reflection-type projection system embodiment of my invention.

In FIG. 1 I have illustrated an optical system for producing color images on a screen 1 corresponding to diffraction gratings in a light modulating medium 2. Medium 2 may be a thermoplastic coated tape in which diffraction gratings have been impressed by, for example, the invention described and claimed in my copending application S.N. 698,167, filed November 22, 1957, now abandoned, and assigned to the assignee of the present invention. A charge pattern corresponding to diffraction gratings may be deposited on the thermoplastic coating with an electron beam. When the thermoplastic coating is heated and then allowed to cool, this charge pattern produces deformations in the tape corresponding to lines of the desired gratings. Light modulating medium 2 may be moved by suitable means (not illustrated) in the fashion that a film is moved in a movie projector.

For maximum picture brightness medium 2 is illuminated with a plurality of light beams. Although these beams may be produced by a plurality of light sources, a more efficient arrangement is the one illustrated. Here, a single light source 3 produces polychrome light that is cast over a first light mask 4 by a lens 5. Light mask 4 comprises a plurality of opaque bars 6 separated by transparent areas 7, illustrated as slits. Bars 6, only the ends of which are illustrated, are elongated, parallel, and of the same rectangular area. Along the edges of bars 6 red transmisison filter strips 8, having a cut-off wave-length of approximately 5,900 angstroms, extend into areas 7 a predetermined distance. This distance, as is explained below, determines either the increase in red light intensity or the increase in red color purity. For purposes of explanation, it is assumed that the desired results are obtained when each of these red filter strips 8 extends one-fourth the distance across a transparent area 7. Then, one-half of each transparent area 7 is covered by filters. In a specific application the desired red spectral distribution would be selected and the widths of filters 8 determined from this distribution, as will be evident from the following discussion.

The cut-off wavelength of filter strips 8 should be between 5,900 and 6,000 angstroms. If it is at a much shorter wavelength, red color purity is significantly decreased. While if it is at a much longer wavelength, red color intensity is significantly decreased.

Light mask 4 splits the light beam from source 3 into a plurality of light beams. Each of these beams has a center portion containing all the colors of the light from source 3 with red side edges of wavelengths longer than 5,900 angstroms. As mentioned, the total width of the two red side edges of each beam equals the width of the center portion. Thus, in each beam the red wavelengths longer than 5,900 angstroms extend over twice as great a width as the other wavelengths.

These plurality of beams are incident upon medium 2 substantially only over the area of a single frame. They are limited to this area by a second light mask 9 comprising an opaque body 10 with a rectangular aperture 11.

If there are no diffraction gratings in the illuminated frame in medium 2, a lens system 12 focuses these beams upon opaque bars 13 of a third light mask 14. Then no light reaches screen 1. However, any diffraction gratings in this frame diffract colors, the colors corresponding to the diffraction grating parameters, through transparent areas 15 between the opaque bars 13. In the case of phase diffraction gratings, these parameters include the amplitudes and wavelengths of the gratings.

In mask 14, bars 13 block the zero diffracted light. Areas 15 transmit most of the first order diffracted light of the colors corresponding to the diffraction patterns. With three diffraction gratings in medium 2 having parameters corresponding respectively to the red, blue, and green primary colors, the first order diffracted red, green, and blue light in the plurality of beams is transmitted by areas 15. This light is then focused by a lens system 16 on screen 1 where the three colors superimpose to produce a full color image.

In FIG. 2 I have shown blue, green, and red spectral distribution curves 17, 18, and 19, respectively. They are in percent versus wavelength of light for a typical three-color primary system obtained with an optical system as described but not having red filters 8. In other words, the blue, green, and red diffraction gratings in medium 2 diffract light through the transparent areas 15 of wavelength and relative intensities indicated, respectively, by curves 17, 18, and 19. Their center wavelengths are respectively: 4,450, 5,250, and 6,700 angstroms.

A curve 20 represents the second order light diffracted by the red diffraction grating and transmitted by the transparent areas 15. The wavelengths of this light are in the green region where the eye is much more sensitive than it is to red light. Consequently, this second order diffracted light, although of low relative intensity, seriously desaturates the red color as viewed by the eye.

Another curve 21 represents the wavelengths of light diffracted by the red diffraction grating and transmitted by the transparent areas 15 when areas 7 are doubled in width and red filters 8 placed over the increased areas (i.e. if areas 7 are widened only for red light). With the resulting increase in red light produced by the plurality of sources, the light transmitted by the transparent areas 15 may be doubled. Consequently, the peak of curve 21 is illustrated as twice that of curve 19.

The center wavelength of curve 21 is 6,850 angstroms instead of 6,700 angstroms, the center wavelength of curve 19. This shift of 150 angstroms, obtained by increasing the red diffraction pattern wavelength, shifts the second order diffracted light to longer wavelengths by 300 angstroms—curve 22. With these wavelengths much closer to the red region than the wavelengths of the prior second order diffracted light—curve 20—they desaturate the projected red light much less.

If the red center wavelength is shifted to a longer wavelength without areas 7 widened for red light, the wavelengths of light diffracted through areas 15 by the red diffraction grating form a spectrum indicated by a curve 23. It has the same shape as the pre-shift spectrum curve 19 but is displaced to a longer wavelength by the amount of the wavelength shift. Due to the low intensity of curve 23 in the region of 6,000 angstroms, where the eye is most sensitive to red, this shift should not be made without increasing areas 7 for red light.

As is indicated by a dotted line portion 24 of curve 18, filters 8 also transmit incident wavelengths longer than 5,900 angstroms that are diffracted by the green diffraction grating. However, the resulting desaturation of the green light in the projected picture is not significant since the eye is much more sensitive to green than to red light.

The shapes of the curves in FIG. 2 as well as the widths and positions of transparent areas 7 and 15 can be better understood by a consideration of the illustrations of FIGS. 3–5. The diffraction equation $$d_1 = \frac{d\lambda}{s}$$

is included in the discussion of these figures. In this equation $d_1$ is the distance from the zero order point on the third mask 14, point 25 in FIG. 3, to the first order diffracted light of wavelength $\lambda$, $d$ is the distance between medium 2 and mask 14, and $s$ the wavelength of the diffraction grating in medium 2 diffracting the light of wavelength $\lambda$.

To simplify the explanations, I have in FIGS. 3–5 illustrated only a portion of medium 2 and of the first and third light masks 4 and 14 with one transparent area 7 and 15, respectively, in each. But the results obtained are equally applicable to all the transparent areas 7 and 15. Also, although I have not illustrated the lens system 12 of FIG. 2, it is considered as acting upon the light beams.

I will first utilize the illustration of FIG. 3 with two beams 26 and 27 of wavelengths 5,800 angstroms and 4,750 angstroms, respectively, in determining the width and position of transparent area 15. These beam wavelengths were selected since they are at 50% points on curve 18, which means that only half of the light of each beam is transmitted by transparent area 15. Consequently, the centers of beams 26 and 27 must strike the upper and lower edges, respectively, of transparent area 15. With the positions of these beams 26 and 27 known, the distance from point 25 to the bottom edge of area 15 may be calculated by inserting wavelength 4,750 angstroms in the diffraction equation and the distance to the top edge by inserting 5,800 angstroms. Thus, the position and width of area 15 are determined.

The width of the center portion of area 7—i.e. the portion not covered by filters 8 can be determined from FIG. 4. In this figure two beams 28 and 29 of wavelengths 4,975 and 4,600 angstroms, respectively, are imaged on the third mask 14 by lens system 12. Lights of these wavelengths were selected since it is known that the images of these beams are contiguous. That these beams are contiguous is evident from the following considerations which show that both beams have ends at the lower edge of area 15. Light of 4,600 angstroms being the shortest wavelength transmitted by area 15, from diffraction by the green diffraction grating in medium 2, must just extend only slightly beyond the bottom edge of transparent area 15. Also, light of 4,975 angstroms being the shortest wavelength in the 100% region of curve 18 is just totally inside the area 15 at the bottom thereof. If a beam of any shorter wavelength were in this position, the 100% region of curve 18 would extend to shorter wavelengths than 4,975 angstroms. And if light of any longer wavelength were in this position, the light of wavelength 4,975 angstroms would not be entirely within transparent area 15 and thus, the point on curve 18 for this wavelength could not be at 100% intensity. Thus, the bottom end of beam 28 touches the top end of beam 29 at the lower edge of area 15.

If the distance between the centers of these light beams 28 and 29 can be calculated, which is the same as the width of either beam, the width of the center portion of area 7 is immediately determined. The center portion width is the same as this distance if there is no magnification or demagnification. And if there is magnification or demagnification, it varies from this width only by the magnification or demagnification factor. Thus, the problem is to find the distance between the centers of the images of beams 28 and 29.

By inserting values of 4,975 and 4,600 angstroms in the diffraction equation, two values of $d_1$ are obtained which are the distances from point 25 to the respective centers of these beams 28 and 29. The distance between center points is calculated by subtracting the two values of $d_1$. This distance is the width of the center portion of area 7.

In this determination of the width of the center of area 7, points on curve 18 were used since this is the only curve with both 50% intensity points within the visible spectrum. But if desired, curve 17 may be extrapolated into the ultraviolet region or curve 21 into the infrared region, and points on one of these curves used instead.

Also, this determination is based upon the knowledge that the areas 15 and 7 determined for curve 18 also transmit the spectral distributions of curve 17 and 21. Usually, however, only the desired spectral distribution is known. Then the widths calculated for only one primary color spectral distribution will only by chance transmit the desired spectral distributions for the other primary colors. But fortunately, the widths of areas 7 and 15 are close for many suitable spectral distributions and can be averaged.

With the widths of areas 7 and 15 determined, the width of bars 13 should next be considered. They can be readily determined from several considerations. First of all, each bar 13 extends from the zero point 25 of nondiffracted light to the edge of the area 15 through which the corresponding diffracted light is transmitted. Actually, each bar 13 extends this distance on both sides of point 25 since light is diffracted on both sides. Secondly, the distance from the zero order point 25 to the center of area 15 can be calculated by inserting into the diffraction equation one of the center wavelengths of the three spectral distribution curves 17, 18, and 21. Then, by subtracting one-half the width of area 15 from this distance, one-half the width of bar 13 is obtained.

It has been found that the desired masking is produced even if another transparent area 15 is inserted between the zero point order 25 and the area 15 through which the corresponding diffracted light is transmitted. The resulting increase in the number of areas 15 in the third mask 14 permits a corresponding increase in the number of areas 7 in first mask 4. By using a greater number of these areas the brightness of the projected picture is increased by a factor of three.

The separations between the areas 7 in the first light mask 4 and thus, the widths of bars 6 depend upon the dimensions of the third light mask 14. The images of areas 7, when there are no diffraction gratings in medium 2, must be at the zero order points 25 in the third light mask 14. Or in other words, midway in the middle of the bars 13. With the positions of these images known, the positions of the areas 7 can be determined by conventional optical considerations. With the positions of areas 7 determined, the widths of bars 6 are known.

The manner in which red filters 8 produce the spectral distribution curve 21 can be understood from the illustration of FIG. 5. In this figure the center portion of area 7 is half the width of area 15. But the total width of area 7 is equal to that of area 15. This area width relationship is necessary to produce the specific curve 21.

The width of only one beam 30 diffracted by the red diffraction grating extends completely across area 15. The wavelength of beam 30 is 6,850 angstroms—the center wavelength of curve 21. With no demagnification in the system the width of this beam is equal to the width of area 7, and thus to the width of area 15. And since it is the center wavelength of a spectral distribution curve, curve 21, its center must coincide with the center of area 15. Thus, the image of beam 30 extends completely across area 15 and all of the light in this beam is transmitted by the third light mask 14.

Beam 30 being twice as wide as the beam of any wavelength corresponding to curves 17 and 18—the beam widths of which equal the width of the center portion of area 7—produces on screen 1 light of twice the intensity of the maximum intensity of any of the green and blue wavelength. This increase in intensity compensates for the decreased sensitivity of the eye to red and for the red deficiency of many light sources.

Only with the width of area 15 equal to the total width of area 7 and only with the width of area 7 half covered by red filters does curve 21 come to a sharp peak of twice the intensity of the maximum amplitudes of curves 17 and 18. If area 15 is wider, more than one wavelength is completely transmitted by the mask 14. Then curve 21 has a flat top. If area 15 is narrower, only a portion of beam 30 is transmitted by mask 14. And the peak of curve 21 is less than 200%. If filters 8 cover any larger portion of area 7 the image of beam 30 is more than twice the width of the green and blue images. Thus, the peak of curve 21 is greater than twice that of the maximum amplitude of curves 17 and 18. If fillers 8 cover any less of area 7 then beam 30 is not twice as wide as the green and blue images and the peak of curve 21 is less than twice that of curves 17 and 18.

From the above explanation the generalization can be made that the increase in red light intensity is a function of two factors: the portion of the areas 7 covered by filters 8, and also the width of areas 15. The maximum possible increase in red light intensity is the ratio of the total width of transparent areas 7 to the width of the center portion. And an increase is obtained only if areas 15 are wide enough to pass at least some of the increased width of the red beams. Actually, it can be shown that there is an increase in red light intensity for those red wavelengths less than maximum intensity even if area 15 is no wider than the width of the center portion of areas 7.

As is typical of optical systems, the illustrated optical system is reversible. Thus, red filters 8 can be placed over portions of the transparent areas 15 rather than over areas 7.

The transparent areas 7 and 15 need not be in the form of slits but may have many other shapes including circular such as is illustrated in the light mask of FIG. 6. This light mask comprises a rectangular-shaped opaque body 31 with circular transparent areas 32 that may be either apertures or clear portions of the body 31. Red filters 33 extending into areas 32 provide larger transparent areas for the red light than for the other colored light. This light mask may be substituted for either the first or third light mask in the optical system of FIG. 1. Then the transparent areas in the other light mask should have a shape, preferably circular, such that the zero order diffracted light is blocked.

In FIG. 7 I have illustrated a complete reflection-type projection system embodying my invention. In this system diffraction gratings formed in a light modulating medium 34 diffract colored light through a light mask onto a screen 1 where this light combines to produce a color image corresponding to the diffraction gratings. Medium 34 may be formed from beeswax, methyl-silicon fluids, as well as some other preferred materials, disclosed and claimed in my Patent 2,943,147, granted June 28, 1960, and assigned to the assignee of the present invention.

In this system a light source 35 illustrated as arc electrodes produces a polychrome beam that is focused, for maximum light transfer, by a spherical mirror 36 on a transparent area 37 of a first light mask 38. Mask 38 comprises a rectangular-shaped opaque member 39 along two interior edges of which two red filters 40 extend into area 37. Filters 40 cause the transmitted beam to be much wider for red light than for blue or green light. This first light mask 38, in addition to producing a wide red beam, limits the size of the picture projected on screen 1.

A plurality of light sources are produced by reflecting the light transmitted by transparent area 39 from a plurality of curved reflecting bars 41. Bars 41 are spaced by transparent areas 42 to form a second light mask 43. Due to the curvature of bars 41, virtual images of transparent area 37 are formed behind bars 41 approximately in the surface of transparent areas 42. These images, which have red edges, are the plurality of light sources desired.

A lens system 44 images the light transmitted by transparent area 37 on medium 34 in the direction of the center line of bars 41.

A mirror 45 beneath medium 34 focuses light from these virtual images back onto bars 41 when there are no diffraction gratings in medium 34. If a diffraction grating is formed in medium 34 that diffracts light normal to the center line of bars 41, it diffracts light through the transparent areas 42 as a function of the parameters of the diffraction pattern.

Bars 41 of the second light mask 43 perform two functions: they produce a plurality of spaced light beams as does the light mask 4 in FIG. 1, and they mask the zero order diffracted light as does the third light mask 14 in FIG. 1. Consequently, the same considerations used to determine the sizes and positions of the transparent areas 7 and 15 in FIG. 1 can be used to determine the sizes and shapes of bars 41 and areas 42 in FIG. 7. However, a varying magnification factor must be included since due to the tilt of bars 41 with respect to mirror 45 the object to image distance varies for the light reflected along the length of each bar 41. Consequently, bars 41 must vary in size and curvature along their lengths. The determination of the proper sizes, shapes, and positions of the bars 41 is explained in more detail in my Patent 2,995,067, granted August 8, 1961, in which curved bar systems are described and claimed. This application is assigned to the assignee of the present invention.

The diffraction gratings are formed in medium 34 by an electron charge pattern produced by an electron gun system energized by sources 46, 47, and 48, respectively, of blue, green, and red video signals. As these sources may be the corresponding circuits in a color television camera or receiver their circuit details have been omitted. The video signals from sources 46, 47, and 48 are mixed, respectively, with signals from three oscillators 49, 50, and 51 in mixer electron discharge devices 52, 53, and 54, respectively. The resulting mixed signals have frequencies determined respectively by the frequencies of oscillators 49, 50, and 51 and amplitudes corresponding, respectively, to the amplitudes of the blue, green, and red video signals. These mixed signals are applied to deflection plates 55 for the velocity modulation of the deflection on electron beam 56. Conventional deflection signals applied to a yoke 57 from a source 58 deflect beam 56 over the surface of medium 34. A lead 59 conducts the horizontal synchronizing pulses from sweep circuit 58 for triggering oscillators 49, 50, and 51 at the beginning of each horizontal deflection. These oscillators may, for example, be circuits containing normally cut-off tubes with parallel inductance and capacitance plate circuits tuned to the desired frequencies of operation. Each horizontal synchronizing pulse triggers these tubes on thereby causing the tuned circuits to oscillate for a time of the order of one horizontal deflection.

The formation of the diffraction gratings in medium 34 may be better understood by a consideration of the formation of only one diffraction grating, for example, the blue diffraction grating. In the formation of this pattern, the blue video circuit 46, the blue oscillator 49 and the discharge device 52 are the principal electronic components. The signal produced by oscillator 49 is applied through discharge device 52 to deflection plates 55 to cause momentary accelerations and retardations of the beam 56. These occur at points on medium 34 separated by distances equal to half the wavelength of a diffraction grating that diffracts blue light through areas 42. At each point of retardation, beam 56 produces an increased electron charge and thus a depression while at each point of acceleration it produces a decreased charge and thus an elevation. The large electrostatic forces between the electrons and the conducting mirror 45 at the points of maximum charge, produce depressions. But the small electrostatic forces at the points of minimum charge cannot contain the material that is pushed up at the sides of the depressions. Thus, elevations are formed there. Since the separations between these points of depressions and elevations are dependent upon the frequency of operation of oscillator 49, the wavelength of this resulting diffraction grating is a function of this frequency.

The amplitude of this diffraction grating depends upon the amplitude of the blue video signal. When the blue signal amplitude is small the amount of acceleration and deceleration of beam 56 is much less than when this signal amplitude is large. Consequently, the number of electrons deposited at any one point and thus, the depth of the resulting depression or the height of the resulting elevation is a function of the amplitude of the blue video signal.

The green and the red diffraction gratings are formed simultaneously with the blue diffraction gratings in the manner explained above. Of course, the parameters of the green diffraction gratings are functions of the frequency and amplitude of the signals from oscillator 50 and source 47, respectively. And the parameters of the red diffraction gratings are functions of the frequency and amplitude of the signals from oscillator 51 and source 48.

In a television application these diffraction gratings should decrease to approximately zero amplitude before the formation of the diffraction gratings for the following frame. Consequently, the resistivity of medium 34 must be sufficiently low to permit leakage of most of the charge from the charge pattern to conducting mirror 45 and also across the surface within the period of a frame. There is, inherently, a small residual charge that maintains the diffraction gratings from a prior frame at a very low amplitude. But due to the synchronization of oscillators 49, 50, and 51 with the horizontal sweep there are few interferences with the succeeding frame which as a rule does not change much in content.

The colored light diffracted through transparent areas 42 of mask 43 by these diffraction gratings is focused by lens system 16 on screen 1 after reflection from a plane mirror 60. The 90° deflection of this light by mirror 60 permits the arrangement of screen 1 parallel with the system axis.

Increased red light is obtained for the projected pictures in FIG. 7 through the utilization of the red filters 40 in the first light mask 38. With filters 40 in transparent area 37, the virtual images of area 37 formed behind the bars 41 each comprise a central portion of polychrome light on both sides of which are two strips of red light. Thus, the virtual light sources formed by second light mask 43 in FIG. 7, as the real light sources formed by the first light mask 4 in FIG. 1, have wider red beams than green or blue. As has been explained, these wider red beams cause an increase in the red light intensity projected on screen 1.

Although in FIG. 7 I have illustrated the red filters 40 extending into transparent area 37, they may be placed on the edges of bars 41. But then more than two filters are required. In general, these red filters can be placed not only at the image of the light source (FIG. 7) and at the transparent areas (FIG. 1) but also at the light source. In those optical systems in which there are images of the transparent areas, they may also be placed at these images.

My invention, although described in reference to improving red primary color purity, is equally applicable for increasing the purity of other primary colors. And further, two primary colors, as for example, red and blue can be improved simultaneously. The red and blue purity can be improved by utilizing a magenta filter arrangement.

Other devices can be used for increasing the width of a beam of a certain color, although filters are preferred. For example, in FIG. 7 mirrors can be used in place of filters 40. These mirrors may reflect light from a red light source while blocking light from source 35 thereby producing a beam of light in which the red light beam is widest. If lenses are utilized to form the individual beams as, for example, as is described and claimed in my aforementioned Patent 2,995,067, which is assigned to the assignee of the present invention, the wider red beams can be obtained by utilizing lenses with high chromatic aberration.

While the invention has been described with respect to certain specific embodiments, it will be appreciated that many modifications and changes may be made without departing from the spirit of the invention. I intend, therefore, by the appended claims, to cover all such modifications and changes as fall within the true spirit and scope of my invention.

What I claim as new and desire to secure by Letters Patent of the United States is:

1. In a system for projection on a light receiving surface a plurality of primary colors corresponding to a plurality of diffraction gratings in a light modulating medium, wherein each diffraction grating has parameters corresponding to a different primary color, an optical system comprising a light receiving surface, a light source for projecting polychrome light on the grating elements of said modulating medium, means for producing a wider beam on the grating elements for one color in the direction of diffraction by the diffraction grating corresponding to said one color than the width of one other of said primary colors in the direction of diffraction by the diffraction grating corresponding to said one other primary color, and masking means for passing the light diffracted by said diffraction gratings including larger portions of diffracted light corresponding to said one color.

2. The system as defined in claim 1 wherein said light source comprises a source of polychrome light and second means for masking the polychrome light from said source of polychrome light, said second masking means comprising opaque material with a transparent portion therein, and a transmission filter for only said one color partially extending over said transparent portion in the diffracting direction.

3. The system as defined in claim 2 wherein said filter is a red transmission filter having a cut-off wavelength within the range of 5,900 to 6,000 angstroms.

4. A projection color system for producing a color image on a screen corresponding to an applied color signal, said system comprising a light source for producing a plurality of primary colors including red, a light mask for producing a beam elongated in cross-section and having red filters with a cut-off wavelength within the range of 5,900 and 6,000 angstroms for partially masking said light beam in width such that the red light has a wider beam than does any of the other primary colors from said light source, a medium generally perpendicular to said beam and containing a plurality of diffraction gratings having parameters corresponding to different ones of said primary colors and wherein the elements of said gratings are oriented for individual illumination by said beam, one of said colors being red, a second light mask provided with apertures for transmitting first order diffracted light diffracted by said gratings, and a projection screen positioned to be illuminated by some of the light diffracted by said diffraction gratings and transmitted by said apertures.

5. A projection system comprising a medium containing a plurality of diffraction gratings corresponding to different primary colors, a source of polychrome light for projecting light on the diffracting elements of said medium to be diffracted by said diffraction gratings, a first light mask for masking said polychrome light provided with means such that one of said colors has a wider beam in the direction of diffraction by the diffraction grating corresponding to said one color than does another of said colors in the direction of diffraction by the diffraction grating corresponding to said another color.

6. A projection system comprising a medium containing a plurality of diffraction gratings corresponding to different primary colors, one of said colors being red, a source of polychrome light for projecting light, including red light, on said medium to be diffracted by said diffraction gratings, and a first light mask for masking said polychrome light, said light mask comprising opaque material with a transparent area therein and a red transmission filter having a cut-off wavelength within the range of 5,900 to 6.000 angstroms, said filter only partially covering said transparent area.

7. A projection system comprising a medium containing a plurality of diffraction gratings corresponding to different primary colors, an image receiving surface, a light source for projecting polychrome light on said medium to be diffracted by said diffraction gratings onto said image receiving surface, and a masking system comprising a first light mask for splitting the polychrome light from said source into a plurality of beams that are incident on the diffracting elements of said medium, and a second light mask provided with apertures for masking the light diffracted by said diffraction gratings such that certain preselected colors are incident on said image receiving surface, the width of said apertures being selected to pass portions of the first order diffraction patterns of said primary colors at said second light mask, said masking system having different dimensions in the diffracting direction for one of said colors more than another of said colors.

8. Apparatus for producing a color image corresponding to plural diffraction gratings having parameters corresponding to different colors in a modulating medium comprising an image receiving surface, a plurality of light transmitting areas for transmitting a plurality of light beams for reception by the grating elements of said modulating medium, wherein said areas transmit poly-chromatic light beams of predetermined first cross section corresponding to predetermined first colors but of larger second cross section in the diffracting direction for at least a second selected color, a mask between said modulating medium and said image receiving surface, said mask being provided with apertures for passing to said image receiving surface the first order diffracted light from the diffraction gratings of said medium, said apertures passing a greater proportion of diffracted light corresponding to said color.

9. The apparatus of claim 8 wherein said light transmitting areas include transmission filters extending part way across said areas in the diffracting direction a distance corresponding to the difference between said first and second cross sections and adapted to transmit light of only said second color.

10. In a system for producing a color image on a receiving surface including a light modulating medium having diffraction gratings with parameters corresponding to different colors; a light source for projecting a light beam on the elements of said gratings; and a masking system cooperating with said modulating medium for substantially masking from said receiving surface light except first order color diffracted light components diffracted by said gratings; said light source, said medium, and said masking system defining a light beam path; the improvement comprising means in said light beam path for increasing the width of said light beam transmitted to the image receiving surface for a selected one said color in the direction of diffraction by the diffraction grating corresponding to said one color.

References Cited in the file of this patent

UNITED STATES PATENTS

| | | |
|---|---|---|
| 648,748 | Ives | May 1, 1900 |
| 1,897,274 | Oswald | Feb. 14, 1933 |
| 2,451,164 | Grimson | Oct. 12, 1948 |
| 2,813,146 | Glenn | Nov. 12, 1957 |
| 2,848,533 | Burr | Aug. 19, 1958 |
| 2,914,987 | Grosswhite et al. | Dec. 1, 1959 |